United States Patent [19]

Yasunaga

[11] Patent Number: 5,241,175
[45] Date of Patent: Aug. 31, 1993

[54] METHOD AND EQUIPMENT FOR PREDICTION OF VOLCANIC ERUPTION AND EARTHQUAKE

[75] Inventor: Soichiro Yasunaga, Kanagawa, Japan
[73] Assignee: Riken Denshi Co., Ltd., Japan
[21] Appl. No.: 798,553
[22] Filed: Nov. 26, 1991

[30] Foreign Application Priority Data

Sep. 27, 1991 [JP] Japan ................... 3-277118

[51] Int. Cl.[5] ............................................. G01V 5/00
[52] U.S. Cl. .................................. 250/253; 364/421; 324/323; 250/262
[58] Field of Search ............... 250/253, 256, 261, 269, 250/262; 364/421, 420; 324/344, 323

[56] References Cited

U.S. PATENT DOCUMENTS

| | | | |
|---|---|---|---|
| 3,612,877 | 10/1971 | Hopkinson | 250/261 |
| 4,005,290 | 1/1977 | Allen | 250/261 |
| 4,021,666 | 5/1977 | Allen | 250/269 |
| 4,814,610 | 3/1989 | Amali et al. | 250/256 |
| 4,884,030 | 11/1989 | Naville et al. | 364/420 |
| 4,904,943 | 2/1990 | Takahashi | 364/420 |
| 4,961,143 | 10/1990 | Takahashi et al. | 364/420 |

OTHER PUBLICATIONS

Ramola, R. C. et al., "The Use of Radon as an Earthquake Precursor", 1990, Nuclear Geophysics, vol. 4, No. 2, pp. 275-287.

Primary Examiner—Carolyn E. Fields
Assistant Examiner—Drew A. Dunn
Attorney, Agent, or Firm—Wall and Roehrig

[57] ABSTRACT

This invention provides method and apparatus to predict accurately volcanic eruptions or the occurrence of earthquakes without the use of a seismometer or an incline level meter. The apparatus includes a neutron sensor, a counter and a displaying device to indicate an integrated count number or changes in count number of neutrons radiated from the earth's magma with the prediction being performed on basis of the changing count or integrated count number for a given period of time.

4 Claims, 4 Drawing Sheets

METHOD AND EQUIPMENT FOR PREDICTION OF VOLCANIC ERUPTION AND EARTHQUAKE

BACKGROUND OF THE INVENTION

This invention relates to a method and equipment for predicting when a volcanic eruption or earthquake will occur.

Since the occurrence of a volcanic eruption or earthquake can cause a great deal of damage to people and property in the danger zone, as for example in the Unzen-Fukendake or the Kanto earthquakes, it is highly desirous to be able to accurately predict such an occurrence to minimize the amount of damage that might ensue. Currently, in order to predict the volcanic eruption through the investigation of volcanic activity, an incline level meter is placed on the volcano skin surface to predict the volcanic eruption by measuring changes in an inclination of the mountain's skin surface caused by a magma's activity. Alternately, a seismometer is placed near the volcano to predict the volcanic eruption by monitoring an occurrence of an earthquake activated by the magna's activity. Moreover, seismometers are placed at a plurality of locations and an incline level meter is also placed at certain sites on the earth s surface in an effort to predict the occurrence of an earthquake gathering different data including seismic intensity obtained, changes in the degree of an inclination of the mountain's skin surface, and the beginning of cracks at the earth's surface layer.

According to the aforementioned techniques, it is quite difficult to predict the onset of a volcanic eruption accurately because of the ever-fluctuating inclination of the earth's surface caused by the magma's activity and the difficulties associated with locating the incline level meters. Furthermore, when a seismometer is utilized in predicting volcanic eruptions by monitoring changes in seismic intensity without being able to compare it with prior data the accuracy of the prediction is greatly reduced. In many cases, old data will not be available.

Similarly, in the prediction of an earthquake the accuracy of the prediction, even when using a plurality of seismometers at carefully selected sites in conjunction with an incline level meter, is oftentimes difficult and the accuracy of such predictions is generally very poor.

It is believed that the source of neutrons on the earth's surface is produced by nuclear fusion on the sun, although the count of the neutrons in the background which is normally detected on the earth's surface varies, depending on specific locations and/or environmental factors. However, if a majority of the detected neutrons originated on the sun, the maximum level of detected neutrons should be found at locations that are in direct sunlight during daylight hours and a minimum level of neutrons will be found where there is darkness during nighttime hours. However, preliminary studies indicated that (i) there is almost no difference in neutron counts between daytime hours and nighttime hours, and (ii) it is difficult to distinguish between the integrated counts of neutrons over a long period of time during the daytime hours and nighttime hours, respectively.

OBJECTS AND SUMMARY OF THE INVENTION

It is therefore an object of the present invention to provide an improved method and apparatus for accurately predicting volcanic eruptions and earthquakes.

It is a further object of the present invention to predict the occurrence of volcanic eruptions or earthquakes by continuously measuring the neutrons without the need of the seismometric equipment or incline level meter.

According to preliminary studies and measurements of 100-hour duration of neutrons at both Tokyo and Fukuoka cities, it was found that (i) the average value of neutron counts measured at Fukuoka city was more than twice than that detected at Tokyo, and (ii) the neutron count measured at a location six kilometers away from the opposite side of the Sakura Island after 100-hours of continuous measurement was more than three times higher than the averaged value of neutron counts measured at Tokyo. Similarly, it was found that (iii) a neutron count after 100-hour continuous measurement at a site 3 kilometers away from the crater of Mount Aso was more than three times higher than the count level detected at Tokyo, and moreover, (iv) at the summit of Mount Aso from which the crater of the inner volcanic mountain can be observed, a count six to ten times higher than that measured at Tokyo was detected. Furthermore, (v) an average level of the neutron count over a 500-hour continuous measurement period at a location about five kilometers away from the crater of currently active Unzen Fukendake Mountain was recorded that was more than five times higher than the averaged value measured at Tokyo; and (vi) this measurement was more than ten times higher than that detected at Tokyo in respect of levels of neutron counts. The large amount of neutrons was detected just prior to an event involving the massive flow of volcanic rocks having a potential to cause a great deal of harm to both human beings and property.

In a first embodiment of the invention a prediction of a volcanic eruption or earthquake is performed by integrating the neutron flux found at the earth's magna (inner shell of the earth) over a predetermined period of time.

In a second embodiment of the invention, a continuous measurement of neutrons being radiated from the inner shell of the earth (magma layer) is performed and a prediction made based on changes in the magma's activity obtained by integrating the neutron flux over a predetermined period of time.

In carrying out the present invention a neutron sensor is employed to detect the neutron count radiated from the magma, a counter to count neutrons above a given reference level, and an integrator for providing an integrated count over a predetermined period of time. Alternatively, a display device may be used in place of the integrating device for displaying changes in the neutron count.

BRIEF DESCRIPTION OF THE DRAWINGS

The above objects, features and advantages of this invention will be described in greater detail below, the description of which should be read in conjunction with the accompanying drawings wherein.

DETAILED DESCRIPTION OF A PREFERRED EMBODIMENT

Figure 1:
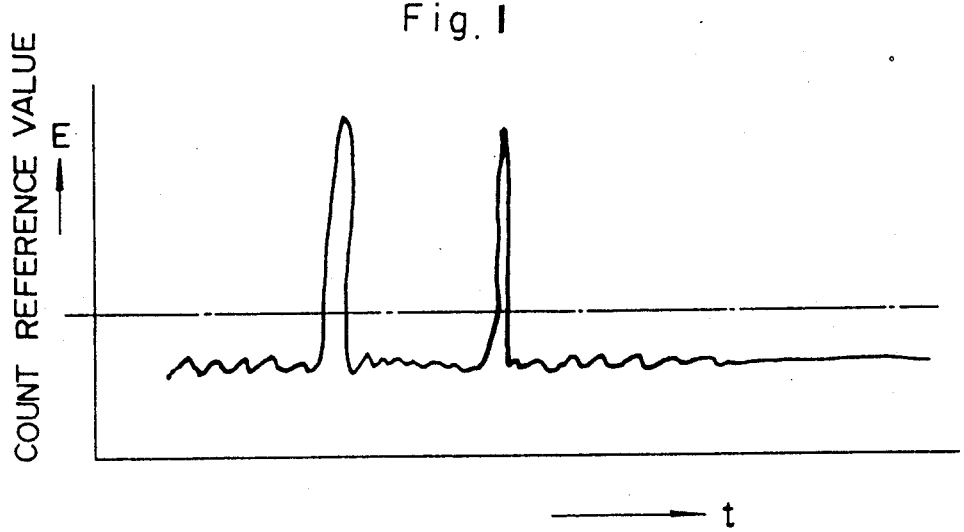
FIG. 1 is a chart showing the setting of reference levels for neutron measurements according to the present invention.
Figure 2:
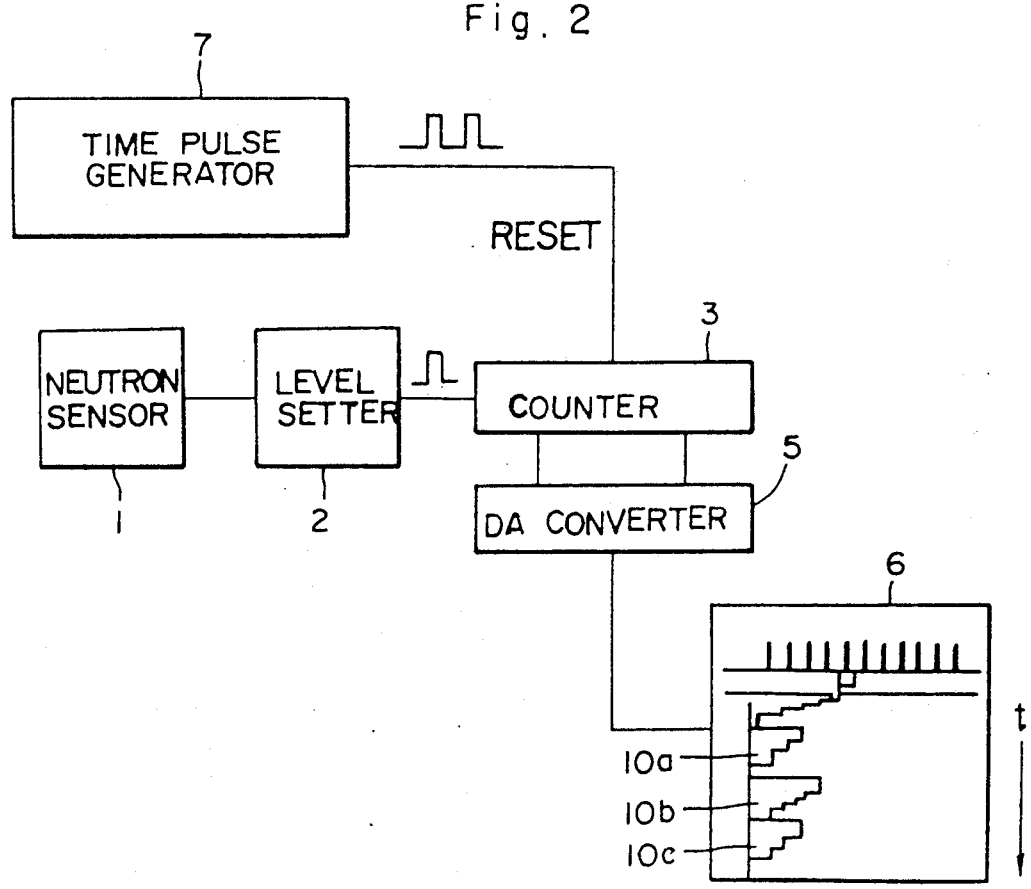
FIG. 2 illustrates a block diagram for the present prediction apparatus used to predict a volcanic eruption or earthquake.
Figure 3:
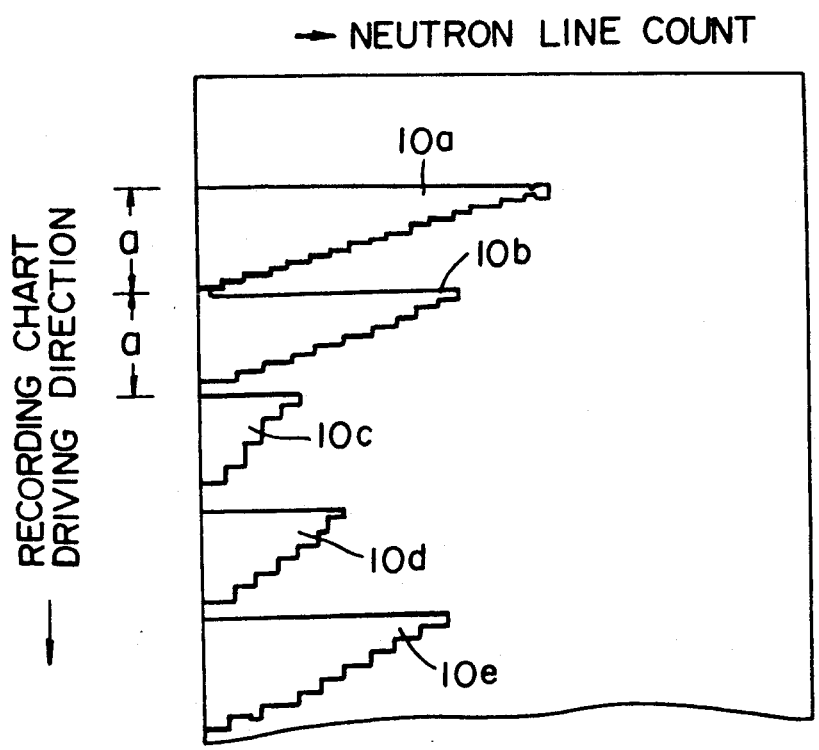
FIG. 3 is a neutron count exhibited by a display device according to one embodiment of the invention.
Figure 4:
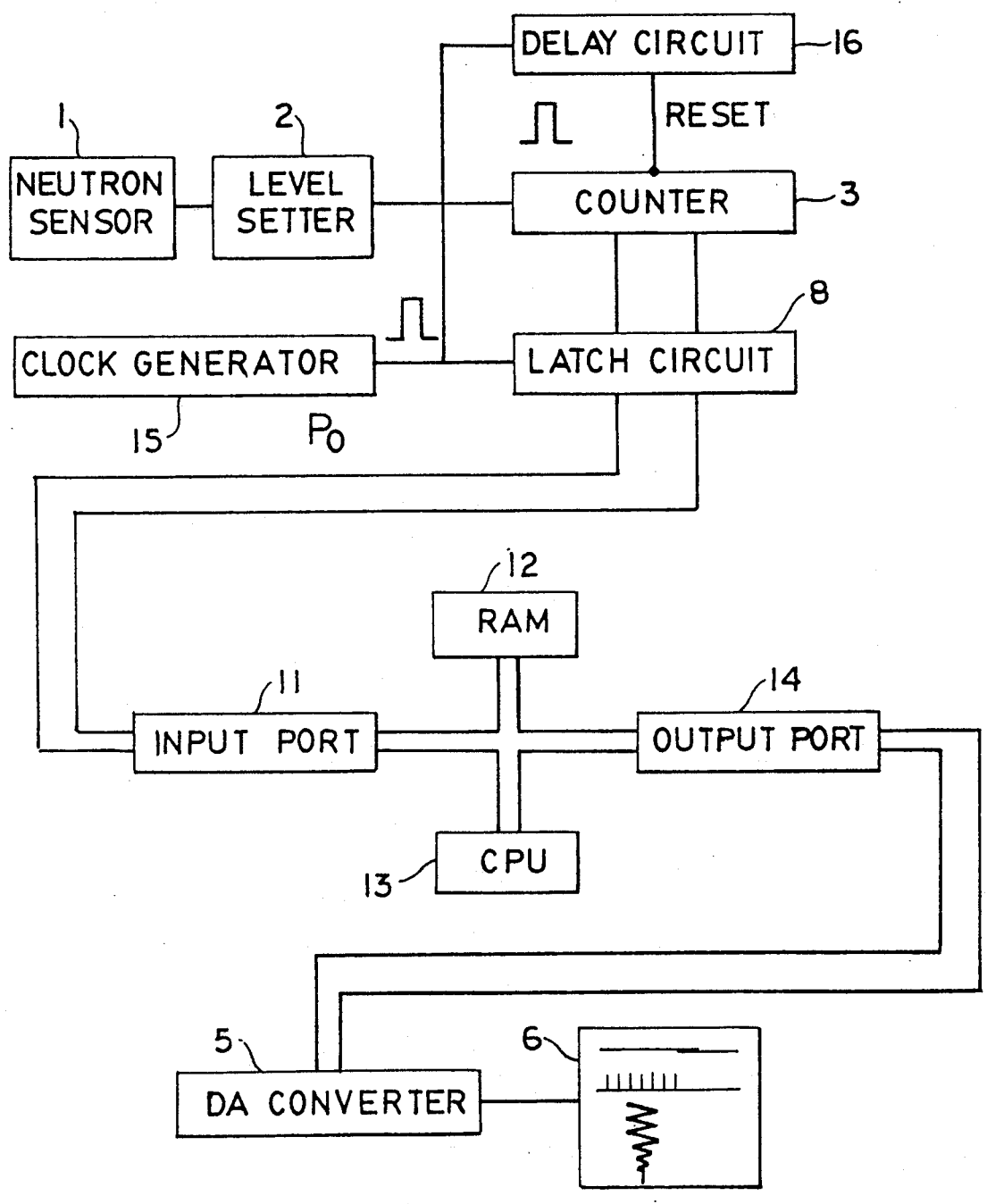
FIG. 4 is a block diagram of apparatus for predicting a volcanic eruption or earthquake.
Figure 5:
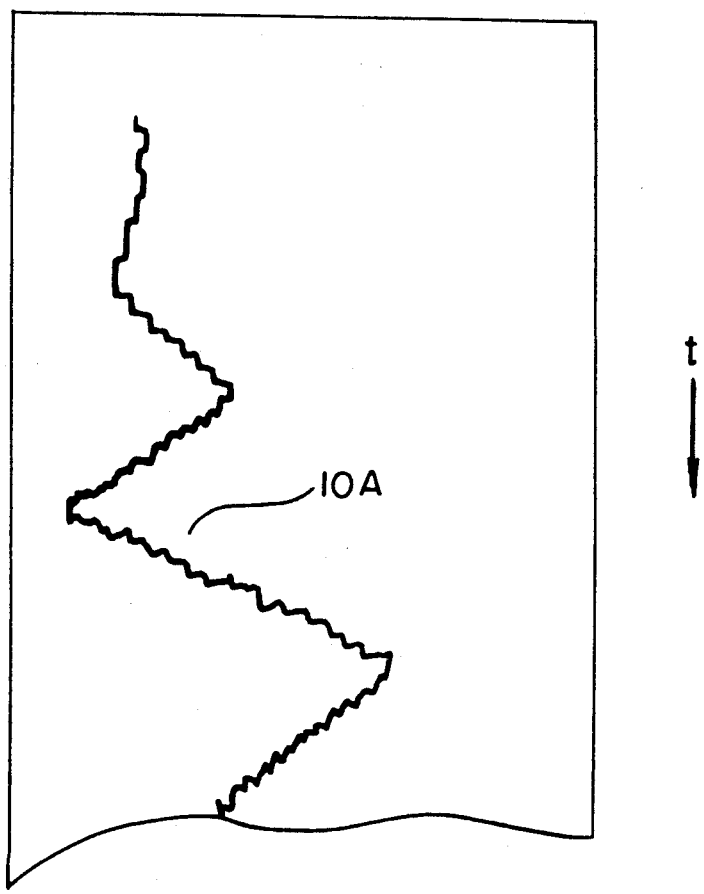
FIG. 5 is another example of a displayed neutron count according to the second embodiment of the present invention.

Referring now to FIGS. 1 through 5, the structure and function of equipment designed for the prediction of volcanic eruptions or earthquakes will be described in greater detail. FIG. 1 shows a chart of the counter reference levels for neutron measurement used in the practice of the invention. The reference level (which is eventually the lower limit) for the neutron measurement is needed in order to prevent undesired errors from occurring caused by noise generated by other substances. FIGS. 2 and 4 show block diagrams of a prediction apparatus for volcanic eruptions or earthquakes according to first and second embodiments, respectively, of this invention. FIGS. 3 and 5 show examples of displaying means according to the first and second embodiments of the present invention, respectively.

As previously mentioned, in the practice of the present invention continuous measurements are conducted on neutrons over 100 hour periods at various locations including Fukuoka city, the opposite side of Sakura Island, near the crater and summit of the inner volcanic of Mount Aso, near the crater of Unzen Fukendake, and the city of Tokyo. It was observed that the detected neutron count level increased as one approached the volcano's crater, when compared to the averaged level value obtained at Tokyo over a continuous 100 hour period.

It is well known that the existence of neutrons is derived from nuclear fusion reactions. However, as mentioned previously, the level of neutrons measured on the earth did not show any distinguishable differences between daytime and nighttime measurements. It is therefore suggested that the majority of detected neutrons on the earth are not produced as previously thought by reactions on the sun, but rather originate from nuclear reactions which are still taking place inside the gradually cooling earth.

Consequently, the degree of the magma's activity generated by nuclear fusion (which is still occurring inside the earth) is related to the occurrence of volcanic eruptions and earthquakes. The degree of activity of the magma is also almost proportional to the detected value of neutrons per a given period of time. Hence, the degree of magma's activity can be detected with accuracy based on the neutron count level detected at a certain location near volcanic craters or within volcanic regions. Since the neutron can strongly penetrate many substances, neutrons can pass upwardly through thick layers of rock from the earth's core to the earth's surface with a slight loss of the count level. The penetrating neutrons can thus be detected and utilized as indicators of the earth's activity to predict the onset of earthquakes and volcanic eruptions.

As seen in FIG. 2, according to the first embodiment of the present invention, the output terminal of a neutron sensor 1 is connected to a counter 3 through a level setter 2. A D/A converter 5 is connected to an output terminal of the counter 3. A display device 6 is connected to an output of the D/A converter and an output terminal of a time pulse generator 7 is connected to the reset terminal of counter 3.

Particle detecting using the ionization phenomenon cannot be achieved with neutrons because neutrons do not possess an electric charge. A secondary neutron produced by a reaction with the atomic nucleus of a substance is used herein as the detected material. The most commonly used nucleus reaction is a $^{10}B(n,)^nLi$ reaction, in which $BF_3$ gas is reacted with the neutron and $He^+$ is produced at the negative electrode as electric current.

The output of the sensor 1 is connected to the input on level setter 2 and neutrons whose count level exceeds the predetermined level of the reference value are counted by the counter 3. The counted output from the counter 3 is D/A-converted through a D/A converter 5 and then coupled into a display device 6 to display the count on a recording chart. A pulse coming from the time pulse generator F is supplied to the counter 3 and the counter 3 is reset for each selected unit time, so that the integrated patterns $10a \sim 10e$ of counted number per unit time "a" is displayed on the chart, as seen in FIGS. 2 and 3.

With such constructed apparatus for the prediction of volcanic eruptions or earthquakes, unusual levels of neutrons due to the intensified activity of the magma—prior to the eruption of the volcano or the occurrence of an earthquake—will be detected and noted on the integrated pattern records on the chart per unit period of time by neutron sensor 1 which has been placed at an appropriate location. Consequently, by observing any abnormality from the patterns $10a \sim 10e$ displayed on the recording chart of the displaying device 6, a precise prediction of occurrence of volcanic eruptions or earthquakes can be achieved. When a digital displaying device is employed as a displaying means in the first embodiment of the invention, the D/A converter can be eliminated.

In the second embodiment of the invention, as shown in FIG. 4, an output terminal of the neutron sensor 1 is connected to the counter 3 through level setter 2. An output terminal of the counter 3 is connected to a latch circuit 8. An output terminal of a clock generator 15 is also connected to an input to the latch circuit 8, and further connected to the counter 3 through a delay circuit 16. An output terminal of the latch circuit 8 is connected to input port 11. The input terminal 11, RAM 12 and output port 14 are all connected to the CPU 13. D/A converter 5 is connected to output port 14, and the displaying device 6 is connected to the output terminal of the D/A converter 5.

In the second embodiment of the present invention, an output of the neutron sensor 1 is connected to the level setter 2 to select a neutron count exceeding a selected reference value, which is later counted by the counter 3. Data obtained during a given period of time is latched by the latch circuit 8 and the count number applied to input port 11 through an output signal of the delay circuit 16. An input signal to input port 11 is passed into RAM 12 through CPU 13. A certain number of data points selected from the newest data will be summed by the CPU 13, converted to an analogue signal by the D/A converter through output port 14, and supplied to the displaying device 6. The counted number of neutrons per unit period of time is displayed on the recording chart of display device 6, as shown in FIG. 5.

In the second embodiment, the changing rate of the count number of detected neutrons is read-out from the displayed pattern 10A. In this case, it is known when the changing rate of the counted number of the pattern 10A displayed on the chart exceeds a certain reference level, a volcanic eruption or the occurrence of the earthquake is imminent. That is, whenever the count number exceeds a certain reference level indicating that the magma's energy is increased, an eruption or earthquake will follow. By this second embodiment, an accurate prediction of the volcanic eruption or occurrence of the earthquake can be achieved based on the increased changing rate of the count number of detected neutrons. If a digital displaying device is used as a display device, the D/A converter can be eliminated.

While this invention has been explained with reference to the structure disclosed herein, it is not confined to the details set forth and this application is intended to cover any modifications and changes as may come within the scope of the following claims:

What is claimed is:

1. A method of predicting volcanic eruptions or occurrence of earthquakes that includes the steps of obtaining a count of the number of neutrons being radiated from the magma of the inner shell of the earth for a given unit of time and examining the magma's activity based on an integrated count number obtained during said given unit of time.

2. A method of predicting volcanic eruptions or occurrence of earthquakes that includes the steps of performing a continuous measurement of neutron counts being radiated from the magma of the inner shell of the earth, and examining changes in the magma's activity based on the changing rates of the obtained count number.

3. Apparatus for predicting the occurrence of volcanic eruptions and earthquakes that includes a neutron sensor for detecting neutrons radiated from the magma of the inner shell of the earth, a counter means to count the radiated neutrons, a level setting means for activating said counter means at a predetermined reference value, and integrating means for recording and displaying an integrated count number per unit period of preset measuring time, said integrating means providing an output indicative of magma activity.

4. Apparatus for predicting the occurrence of volcanic eruptions and earthquakes that includes a neutron sensor for detecting neutrons radiated from the magma of the inner shell of the earth, counter means to count the radiated neutrons over given periods of time, a level setting means for activating said counter means at a predetermined reference value, a display means and a recording means for recording changes in the count numbers of said counter, said display and recording means providing an output indicative of magma activity.

* * * * *